United States Patent [19]

Nay et al.

[11] Patent Number: 4,584,619
[45] Date of Patent: Apr. 22, 1986

[54] PROGRAMMABLE SERVO PATTERN GENERATOR

[75] Inventors: Daniel L. Nay, Rancho Palos Verdes; James K. Berger, Malibu, both of Calif.

[73] Assignee: Pioneer Research, Inc., Santa Monica, Calif.

[21] Appl. No.: 584,107

[22] Filed: Feb. 27, 1984

[51] Int. Cl.$^4$ .............................................. G11B 5/012
[52] U.S. Cl. ......................................... 360/75; 360/78
[58] Field of Search ....................... 360/69, 71, 73, 75, 360/77, 78

[56] References Cited

U.S. PATENT DOCUMENTS

| | | | |
|---|---|---|---|
| 4,371,902 | 2/1983 | Baxter et al. | 360/75 |
| 4,414,589 | 11/1983 | Oliver et al. | 360/77 |
| 4,480,277 | 10/1984 | Hara et al. | 360/69 |

FOREIGN PATENT DOCUMENTS

| | | | |
|---|---|---|---|
| 53-138703 | 12/1978 | Japan | 360/75 |
| 53-138710 | 12/1978 | Japan | 360/75 |
| 54-136241 | 10/1979 | Japan | 360/75 |
| 56-22267 | 2/1981 | Japan | 360/75 |

OTHER PUBLICATIONS

IBM Technical Disclosure Bulletin, vol. 20, No. 11A, Apr. 1978, pp. 4616-4618, Servo Track Writer, Mulholland et al.
IBM Technical Disclosure Bulletin, vol. 21, No. 9, Feb. 1979, p. 3772, Stand-Alone Disk Facility Formatting Performed by a Control Unit, W. H. Hausen.

Primary Examiner—George G. Stellar
Attorney, Agent, or Firm—Keith D. Beecher

[57] ABSTRACT

A programmable servo pattern generator for use in a magnetic disc drive servowriter system. The servo pattern generator of the present invention stores a multiplicity of different servo patterns in a convenient user-oriented format, and it provides high frequency pulse trains of NRZ data representing the different servo patterns. These different servo patterns are derived from the pattern generator of the invention as required and in the particular formats to be written into the magnetic disc drives of the same or different manufacturers.

23 Claims, 9 Drawing Figures

PROGRAMMABLE SERVO PATTERN GENERATOR

BACKGROUND OF THE INVENTION

A magnetic disc servowriter system is described in copending application Ser. No. 526,485, filed Aug. 25, 1983 in the name of James K. Berger, and assigned to the present assignee, which is capable of automatically writing servo tracks on the magnetic discs of magnetic disc drives. The programmable servo pattern generator of the present invention is intended for use in magnetic disc servowriter systems such as described in the Berger application to provide a number of different servo patterns complying with the specification of one or more disc drive manufacturers.

The generator of the invention has the capability of storing internally a large number of different servo patterns which may be selected by the operator of the servowriter system referred to above. The patterns are stored in the system in programmable read-only memories (PROMS) which are easily programmable for new requirements.

DETAILED DESCRIPTION OF THE ILLUSTRATED EMBODIMENT

Figure 1:
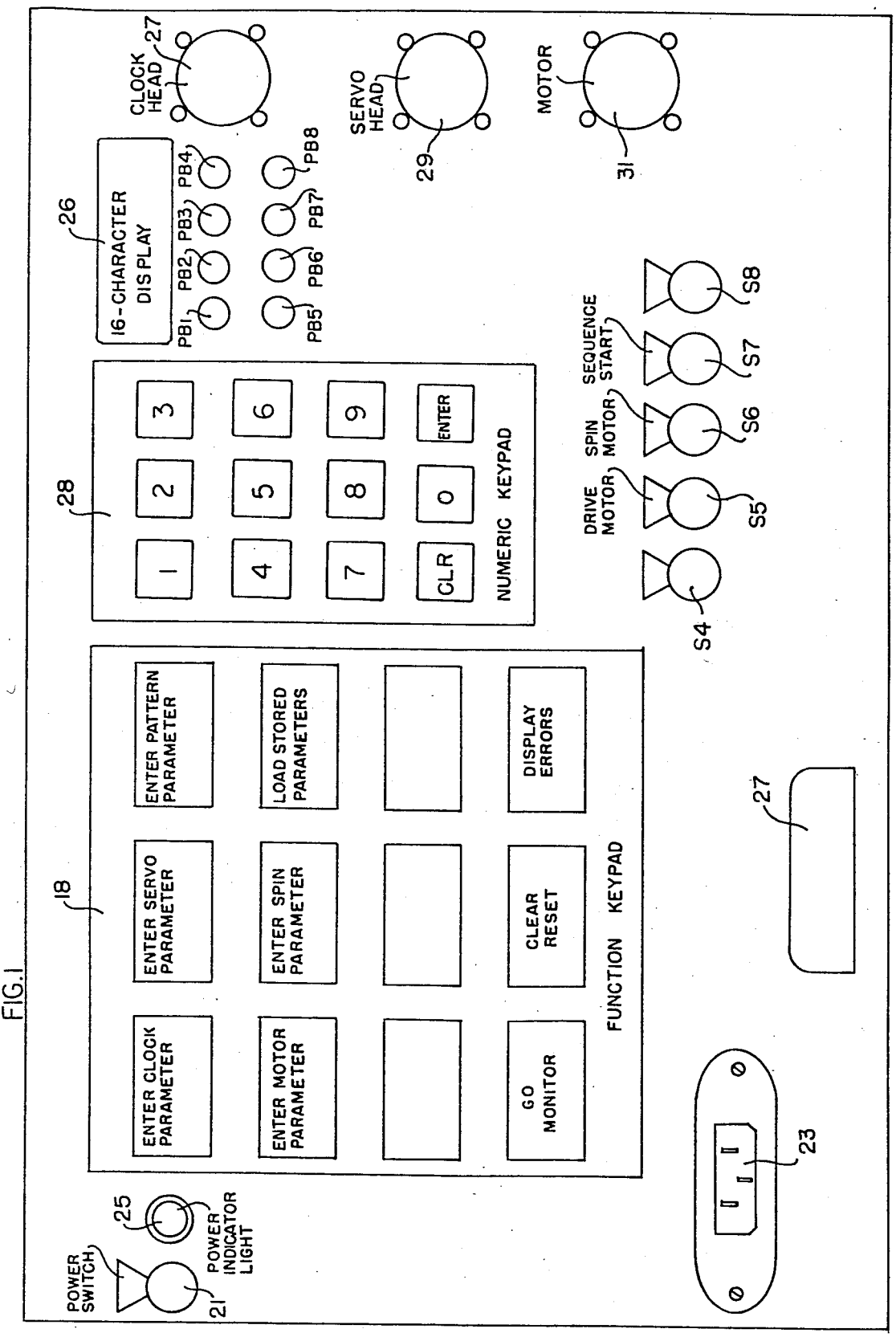
FIG. 1 is a representation of the control panel used in a constructed embodiment of the servowriter system disclosed in the copending Berger application.

As shown in FIG. 1, the control panel of the servowriter which incorporates the servo pattern generator of the invention includes a data entry or function key pad 18. The key pad 18 includes a number of keys designated "ENTER CLOCK PARAMETER", "ENTER MODE PARAMETER", "ENTER PATTERN PARAMETERS", "ENTER MOTOR PARAMETER", "ENTER SPIN PARAMETER", "LOAD STORED PARAMETERS", "GO MONITOR", "CLEAR RESET", "DISPLAY ERRORS".

The display panel also includes a numeric key pad 28 which includes keys 0-9, and "CLEAR" and "ENTER". A 16-character display 26 is also mounted on the front panel. A number of illuminated pushbutton switches designated PB1-PB8 are mounted on the panel; and a number of toggle switches S5-S8. The toggle switch S5 is designated "drive motor", the toggle switch S6 is designated "spin motor", and the toggle switch S7 is designated "sequence start".

When any one of the pushbuttons PB1-PB8 is depressed, it is illuminated, and it remains illuminated until the function corresponding to that pushbutton is completed. At that time, the particular pushbutton goes into a flashing mode, indicating to the operator that the next pushbutton may be depressed. When the start sequence switch S7 is operated, each of the pushbuttons PB1-PB8 is actuated sequentially, and each is illuminated in sequence, to indicate to the operator the status of the sequence of operations initiated by the operation of switch S7.

The front panel also includes a power switch 21, a power indicator light 25, and a power socket 23. A connector 27 is also provided to permit the system to be connected to a cathode-ray tube terminal.

Figure 2:
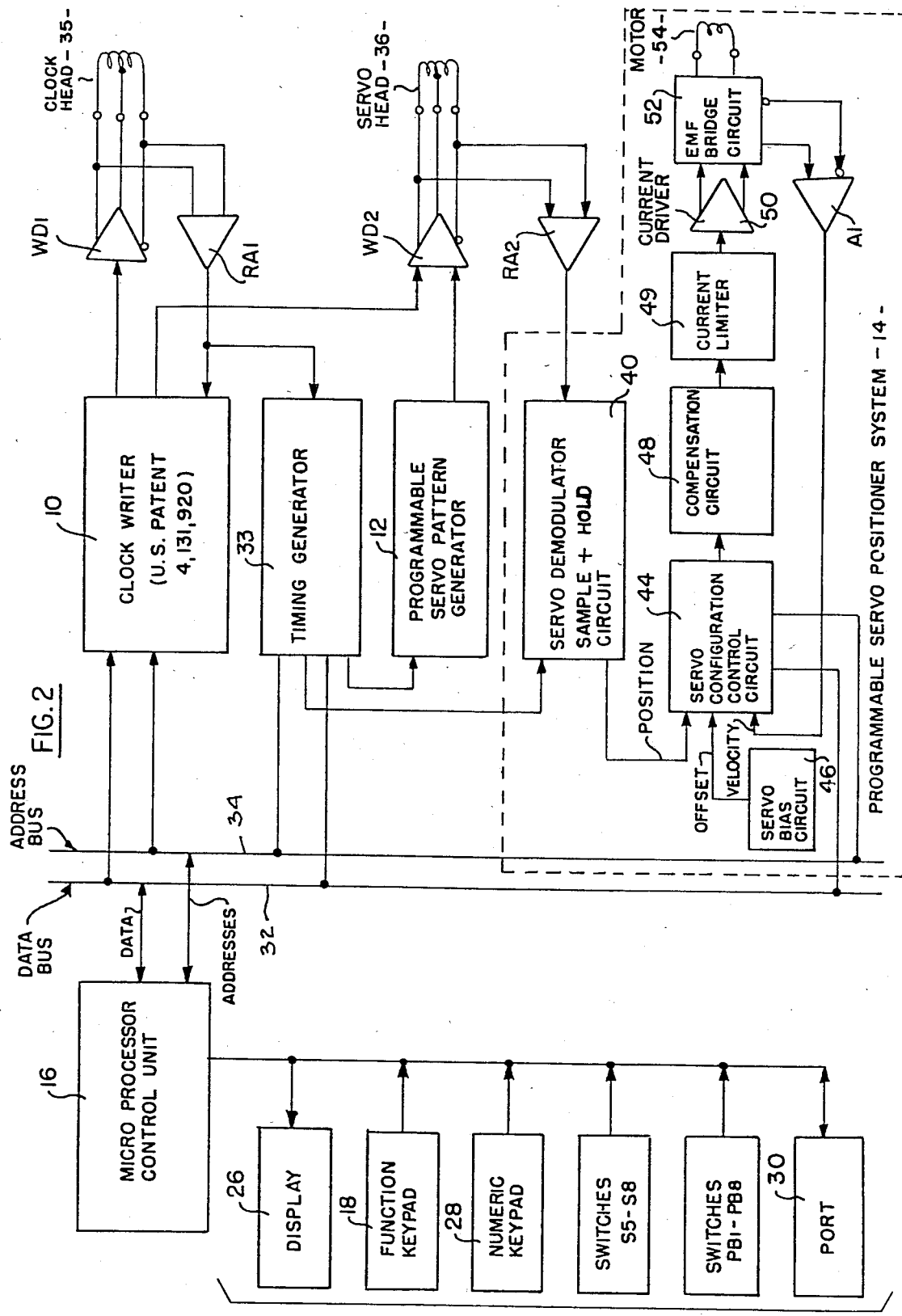
FIG. 2 is a block diagram of the servowriter system disclosed in the Berger application, and showing in block form a programmable servo pattern generator as one of its components, and which may be constructed in accordance with the concept of the present invention.

The system described in the Copending Berger Application comprises four functional elements shown in FIG. 2 which are integrated both physically and operationally. These elements include a precision clockwriter 10, a programmable servo pattern generator 12 constructed in accordance with the present invention, a programmable servo positioner system 14, and a microprocessor control unit 16.

The precision clockwriter 10 may be similar in function to the clockwriter described in U.S. Pat. No. 4,131,920 and which is presently commercially available under the designation PM2390. The clockwriter is capable of writing a closed clock with essentially zero closure error and with negligible frequency modulation. In operation, an origin pulse is first written by a reference clock head, and then a scratch clock signal is written by any convenient servo head at one-eleventh of the final clock frequency. Finally, a precision clock signal is written by the reference head. The precision clock signal includes an encoded clock index. The reference clock writing operation takes less than a minute at 3600 rpm.

The programmable servo pattern generator 12 of the invention stores servo patterns in a convenient user-oriented format, as stated above. The format is algorithmic, so that only 360 data bytes are needed to describe almost any arbitrary servo pattern. User defined patterns are stored internally in the generator in a programmable memory, and the different patterns are selected as required. Different servo patterns may be entered into the generator 12 by means of the data entry key pad 18 (FIG. 1) of the clockwriter, or they may be loaded into the generator from another device through an appropriate interface circuit.

The programmable servo positioner 14, as described in the copending application, is used to control the position of the arm or carriage of the disc drive being processed during servowriting. The positioner has an output driver 50 which connects directly to a motor 54. The motor may be any two-wire actuator such as a torquer or voice coil. The maximum voltage and current of the output driver 50 are programmable. The positioner input is compatible with the output of a standard SSI-104 or SSI-115 preamplifier, or other known linear head pre-amplifier, which is usually located on the arm or carriage being positioned by the positioner. No velocity input is required.

The programmable servo positioner 14 has characteristics which differ from the positioning servo in the disc drive itself. The positioner holds the arm or carriage of the disc drive effectively motionless during the servowriting operation, rather than tracking the eccentricity of a reference which is the normal function of the drive servo.

The microprocessor control unit 16, as shown in FIG. 2, is coupled to the sixteen-character display 26, to the key pads 18 and 28, to the toggle switches S5-S8, and to the pushbutton switches PB1-PB8. The microprocessor control unit is also connected to a port 30, is further connected to a data bus 32 and to an address bus 34 which connects the unit with the other components of the system. The two buses may be multiplexed into a single bus, as is the case in the system to be described.

the programmable servo pattern generator of the invention may have the following specifications, which are listed merely by way of example, and which are not intended to limit the scope of the invention any way.

| PATTERN GENERATOR/VERIFIER CHARACTERISTICS: | | |
|---|---|---|
| FLUX Reversal Positions/Frame | 64 | |
| Frame Types/Track | 8 | Max |
| Frames/Sequence | 256 | Max |
| Frames/Beginning Sequence | 256 | Max |
| Frames/Ending Sequence | 256 | Max |
| Track Types/Surface | 8 | Max |
| Bytes/Track Description | 360 | |
| Bytes/Verification Description | 32 | |
| Pattern Load/Entry | EPROM Keypad RS-232-C | |

Also included in the system of the Copending Application is a timing generator 33. The clock writer 10 is coupled to a clock head 35 through a write amplifier WD1 and through a socket 27 in FIG. 1, and the clock head is coupled back to the clock writer 10 and to the timing generator 33 through socket 27 and through a read amplifier RA1. The clock writer 10 is also coupled through a write amplifier WD2 and through a socket 29 in FIG. 1 to a servo head 36, and the servo head is coupled back through a socket 29 and through read amplifier RA2 to a servo demodulator sample and hold circuit 40 which is included in the programmable servo positioner 14.

Sample and hold circuit 40 is connected to a servo configuration control circuit 44. A servo bias circuit 46 is also connected to control circuit 44, and the control circuit is connected to a compensation circuit 48. Compensation circuit 48 is connected through a limiter circuit 49, to a current driver stage 50 which, in turn, is connected to an EMF bridge circuit 52. The bridge circuit is connected through socket 31 of FIG. 1 to motor 54. The bridge circuit is also connected back through an amplifier A1 to the servo configuration circuit 44.

The timing generator 33, and the pattern generator 12 of the invention, work together to adapt data to the proper format to be written on the servo discs of the disc drives of different manufacturers. These two generators comprise a collection of logic components, by which a description is generated of the particular track in which a particular servo pattern is to be written, and the pattern generator then generates the bits corresponding to that particular pattern.

As stated above, the programmable servo pattern generator 12 of the invention stores a plurality of servo patterns in a convenient user-oriented format so that different manufacturers requirements may be fulfilled. Each servo pattern is generated as a high frequency train of NRZ data. The user, in each instance, selects the servo patterns which are appropriate to his particular disc drive. The pattern generator 12, is capable, for example, of storing up to 16 different patterns. Each pattern is designed to fill one complete track of the disc of the disc drive being processed.

One servo pattern may comprise, for example, a single cell, or it may comprise billions of cells. Within each pattern are repetitive sequences of data of varying lengths. The smallest component of the pattern is one cell which corresponds to one binary bit. A sequence of 5-128 cells is referred to as a frame, which is the basic component of the servo pattern. There can be as many as 16 different types of frames, each with a different sequence of cells (one's or zero's).

A series of frames may be combined within a particular servo pattern to form the next level within the pattern, which is referred to as a group. A group is composed, for example, of 1-256 different frames. There can be as many as 16 different types of groups, each with a different sequence of frames. Each type of group may be a different length. Every frame of every group may be different from the next, as long as each frame conforms to one of the previously defined types of frames.

A group may be repeated over and over again, for example, from 1 to 65,536 times in the embodiment under consideration. The combined sequence is then called a block. A block is composed of only one type of group, but that one type of group can be repeated many times to form the block. There can be up to 16 blocks in one pattern which, as stated, occupies exactly one track on the disc memory. Each block can be a different lenght and use a different group, but only one group type can be used within a block.

Figure 3A:
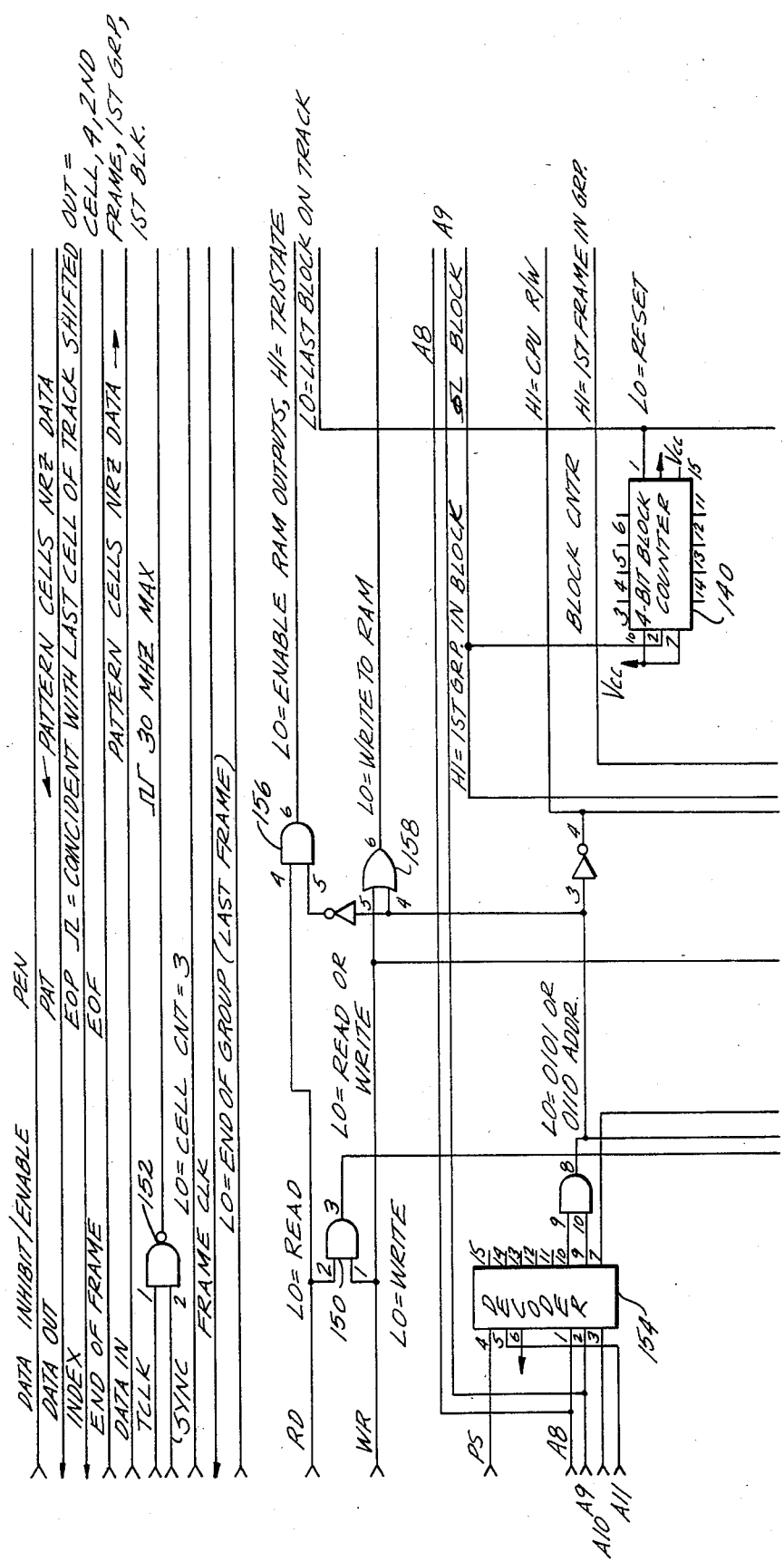
FIGS. 3A-3C collectively show a detailed logic diagram of a first section of the programmable servo pattern generator of FIG. 2, as constructed in accordance with one embodiment of the present invention.
Figure 3B:
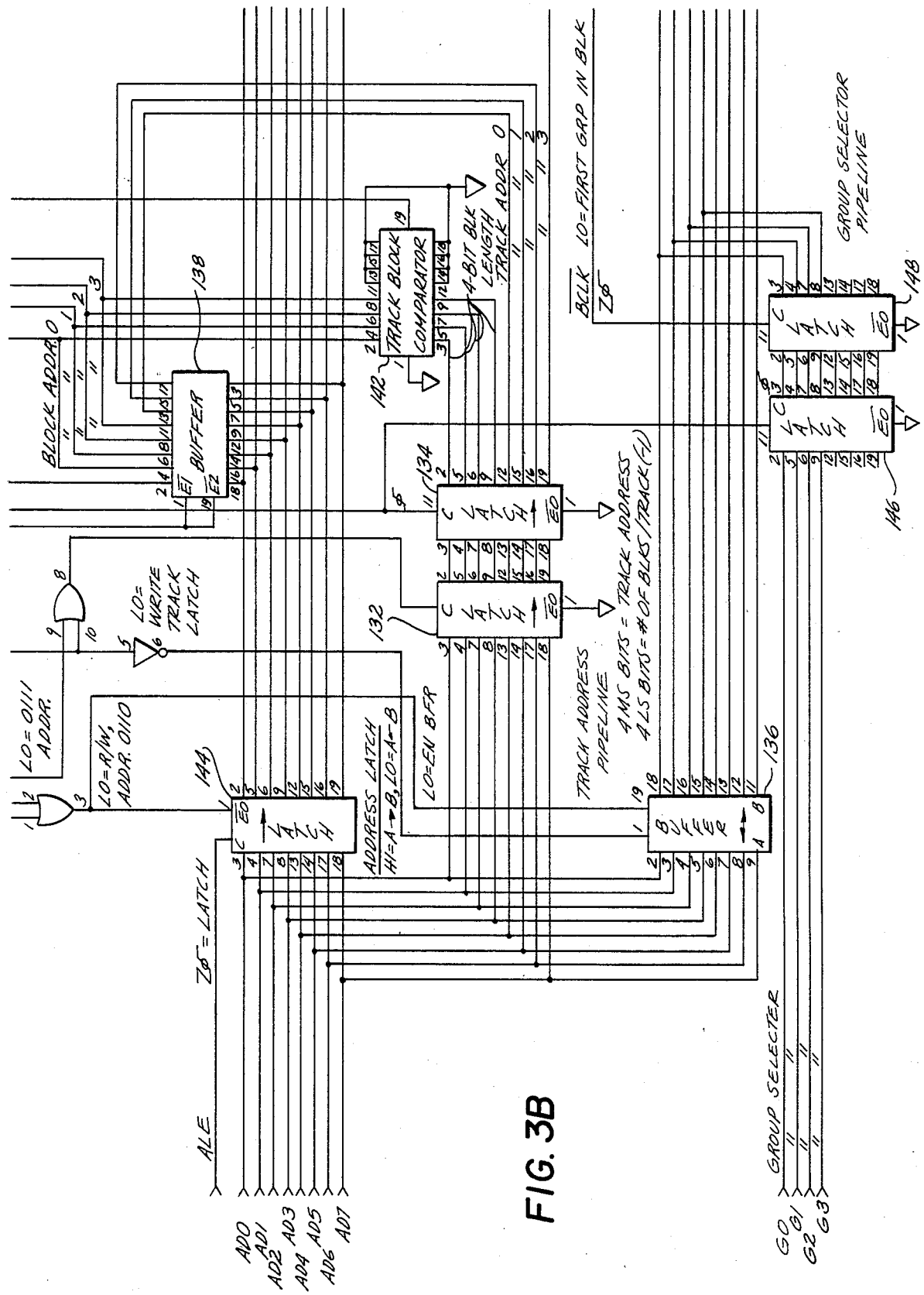
Figure 3C:
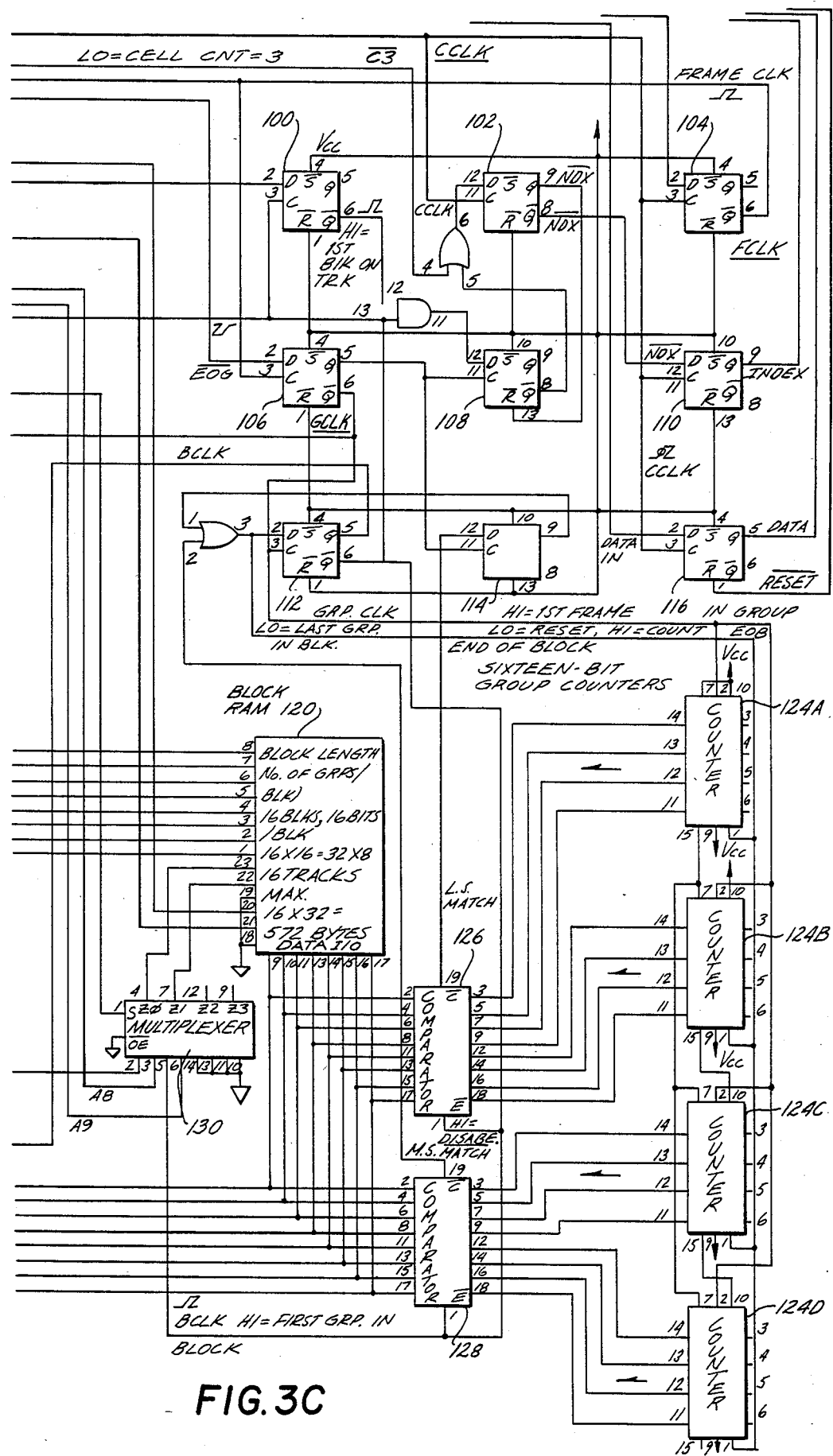
Figure 4A:
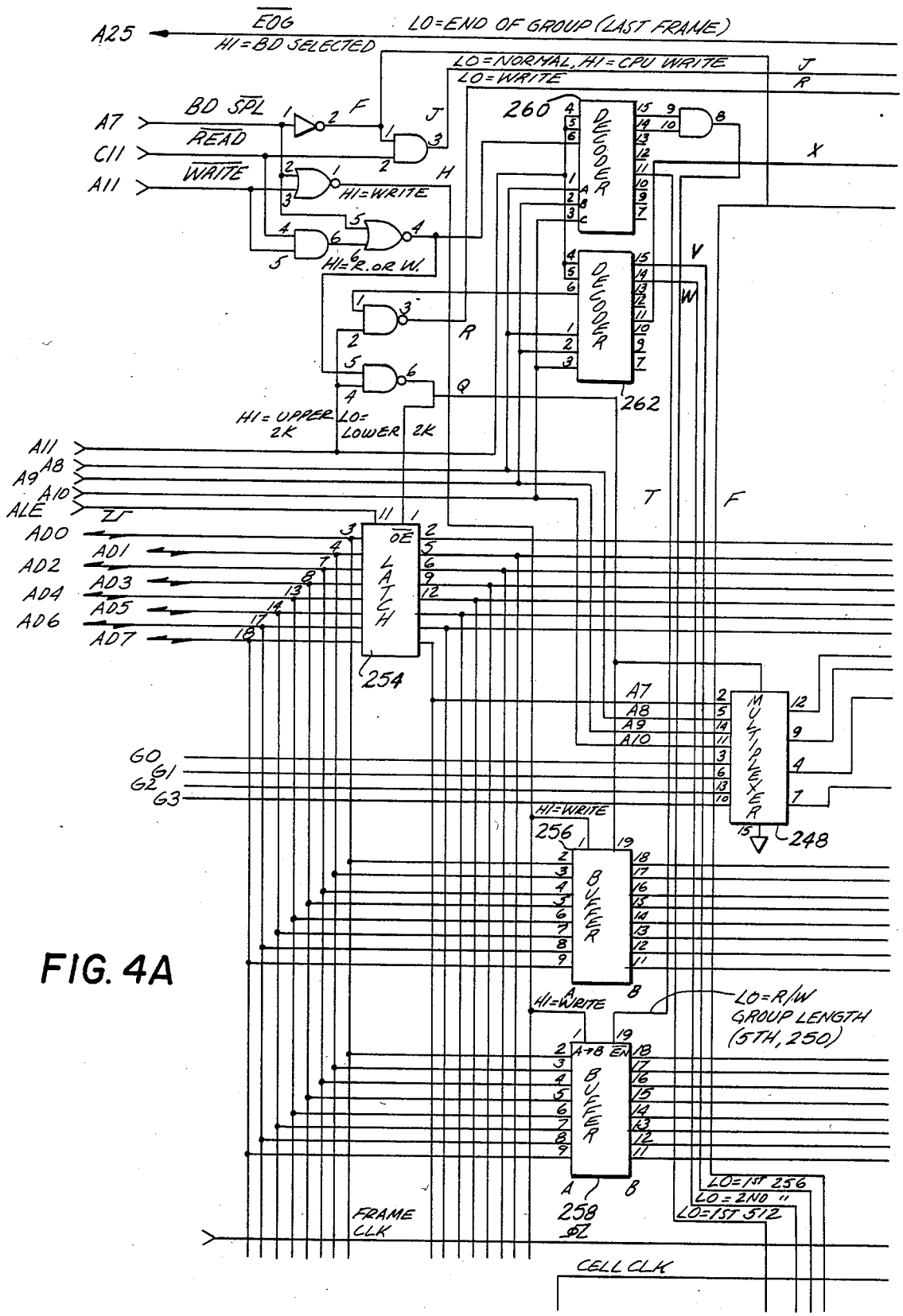
FIGS. 4A-4C collectively show a detailed logic diagram of a second section of the programmable servo pattern generator of FIG. 2.
Figure 4B:
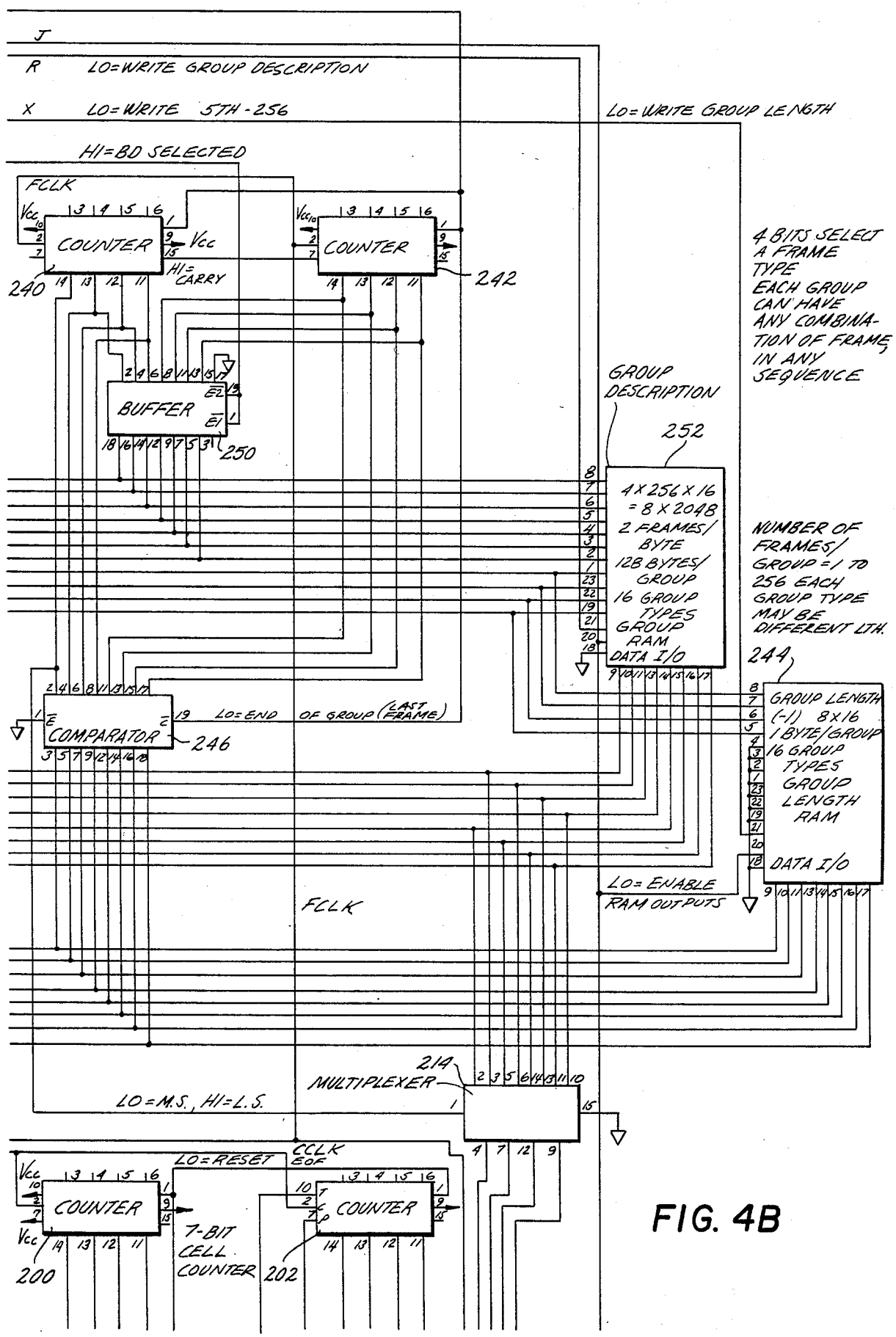
Figure 4C:
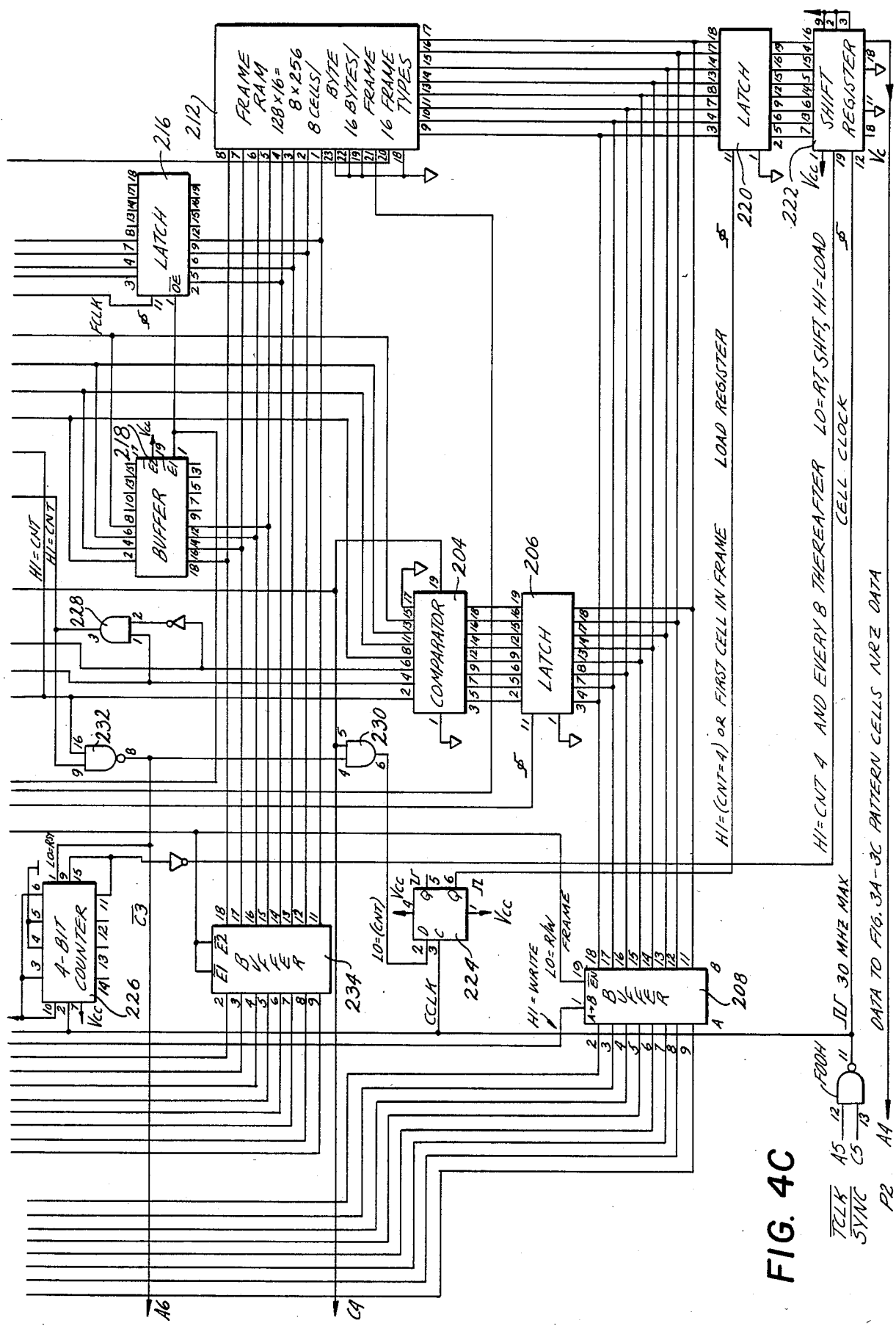

The pattern generator 12 to be described may be formed of circuitry comprising two sections of the generator on two printed circuit boards. The circuitry preferably uses high speed Fairchild integrated circuits. The section of printed circuit board #1 is shown in FIGS. 3A-3C, and the section of printed circuit board #2 is shown in FIGS. 4A-4C. The section of FIGS. 3A-3C provides the larger sequences, while the section of FIGS. 4A-4C is concerned with the finer timing. Specifically, the section of FIGS. 3A-3C contains the servo pattern and block production circuitry and most timing signals; whereas the section of FIGS. 4A-4C contains the group and frame production circuitry.

The sections of FIGS. 3A-3C and FIGS. 4A-4C work together, with each requiring signals from the other. These signals are as follows:
 P1 EOF (End Of Frame)
 P2 DATA (Unbuffered Pattern Data, NRZ)
 P3 C3 (Cell count=3)
 P4
 P5 EOG (End of Group)
 P6 FCLK (Frame Clock)
 P7 G0 (Group Selector, Bit Zero)
 P8 G1 (Group Selector, Bit One)
 P9 G2 (Group Selector, Bit Two)
 P10 G3 (Group Selector, Bit Three)

The signals of P6-P10 originate in the section of FIGS. 3A-3C, and the others originate in the section of FIGS. 4A-4C.

The circuitry of FIGS. 3A-3C contains nine flip-flops designated 100, 102, 104, 106, 108, 110, 112, 114, and 116. The flip-flops perform the following functions:
 Flip-flop 100: Track Clock (TRCLK)
 Flip-flop 102: Index (NDX)
 Flip-flop 104: Frame Clock (FCLK)
 Flip-flop 106: Group Clock (GCLK)
 Flip-flop 108: Index Synchronizer Flip-flop 110: Index Buffer
Flip-flop 112: Block Clock (BCLK)
Flip-flop 114: BLCK Synchronizer
Flip-flop 116: Data Buffer Each of the clock flip-flops 100, 102, 104 and 106 provide a normally low level, with a single pulse whose leading (rising) edge coincides exactly with the start of a corresponding timing period. The fastest clock is the input clock TCLK which can be 30 MHz or higher. The cell clock CCLK (FIG. 5A) is derived from the input clock TCLK. The next clock is the frame clock FCLK (FIG. 5B) which occurs once per frame, and which has a pulse width corresponding to one cycle of the cell clock CCLK. The next clock is the group GCLK (FIG. 5C), which occurs once per group, and which has a pulse width corresponding to one cycle of the frame clock FCLK. The next clock is the block clock BCLK (FIG. 5D), which occurs once per block, and which has a pulse width corresponding to one cycle of the group clock GCLK. The track clock TRCLK (FIG. 5E) occurs once per track, and it has a pulse width corresponding to one cycle of the block clock BCLK.

The index pulse NDX (FIG. 5F) also occurs once per track, and has a width corresponding to one cycle of the cell clock CCLK. The clock pulses TCLK, CCLK, FCLK, GCLK, BCLK and TRCLK are all correlated to the internal timing requirements of the pattern generator, which are not simply related to the data output. However, index NDX (FIG. 5) exactly coincides with the last cell of the pattern as it leaves the generator.

The index synchronizer flip-flop 108 is necessary to convert from internal timing to external timing. The output of that flip-flop goes low only during the second frame of the first group of the first block of a track (pattern). This period covers the external time of transition between the end of one pattern and the beginning of the next. This follows because the pattern generator must start an access to a block random access memory 120 (RAM) two frames before the addressed data will be shifted out of the RAM. That is:

1. Start access of group RAM (time zero)
2. Latch frame selector and start access of frame RAM (time one)
3. Latch frame byte (time two)
4. A cell time later, the shift register load will occur, and the shifting process will begin.

Time "zero" is the start of frame zero; time "one" is the start of frame "one"; and time "two" is four bits later within frame "one". Thus the first bit of frame "zero" gets shifted out of a shift register associated with RAM 120 in the middle of frame "one", and must follow the index pulse.

Both the index and pattern data are buffered by respective flip-flops 110 and 116 and re-synchronized by flowing through the flip-flops, clocked by the bit clock CCLK.

The circuitry of FIG. 3A contains a 16-bit group counter which is made up of four 4-bit counters 124A, 124B, 124C, 124D which serve to count the number of groups in a block. This number can be from 2 to 65,536. The leading edge of group clock GCLK causes the 16-bit counter to increment. Two 8-bit comparators 126 and 128 are used to match the 16-bit counter outputs to another number indicating the desired length of the block. This is actually a two-step process, since the desired length is stored in block RAM 120. RAM 120 may be of the type designated AMD9128-70 having a 70 nanosecond access time.

The group-count/block-length comparison process is as follows:

a. Increment 16-bit group counters 124A–124D
b. Compare least significant 8-bits of the counters to the RAM output, and latch block synchronizer flip-flop 108, with comparison results.
c. Change RAM least significant address bit, to allow the most significant 8-bits output of the block length.
d. Compare the most significant 8-bits of the 16-bit group counter with the new output from RAM.
e. Combine the most significant 8-bits new comparator output with the flip-flop output holding the result of the least significant 8-bit comparison, and latch the new result in the block clock flip-flop 112.
f. Change the RAM address for the next least significant 8-bits comparison.

The timing of the above sequence occurs on the leading edge of group clock GCLK (FIG. 5) for a, d, e and f above, and on the trailing edge of GCLK for b and c above. Thus the GCLK flip-flop 106 latches the LSB comparison and changes the RAM address, and then a half-cycle later, latches the most significant bit (MSB) and the least significant bit (LSB) comparisons, and at the same instant, increments the 16-bit counter 124A–124D and changes the RAM address. The combined comparison in (e) above is also used as the End Of Group (EOG), to reset the 16-bit counter. The block RAM 120 actually serves triple duty. The sequence above shows how the 16-bit block length is stored in two bytes, which are alternately accessed for the group count comparison. In addition, the RAM contains a 4-bit group selector for each block.

Figure 5:
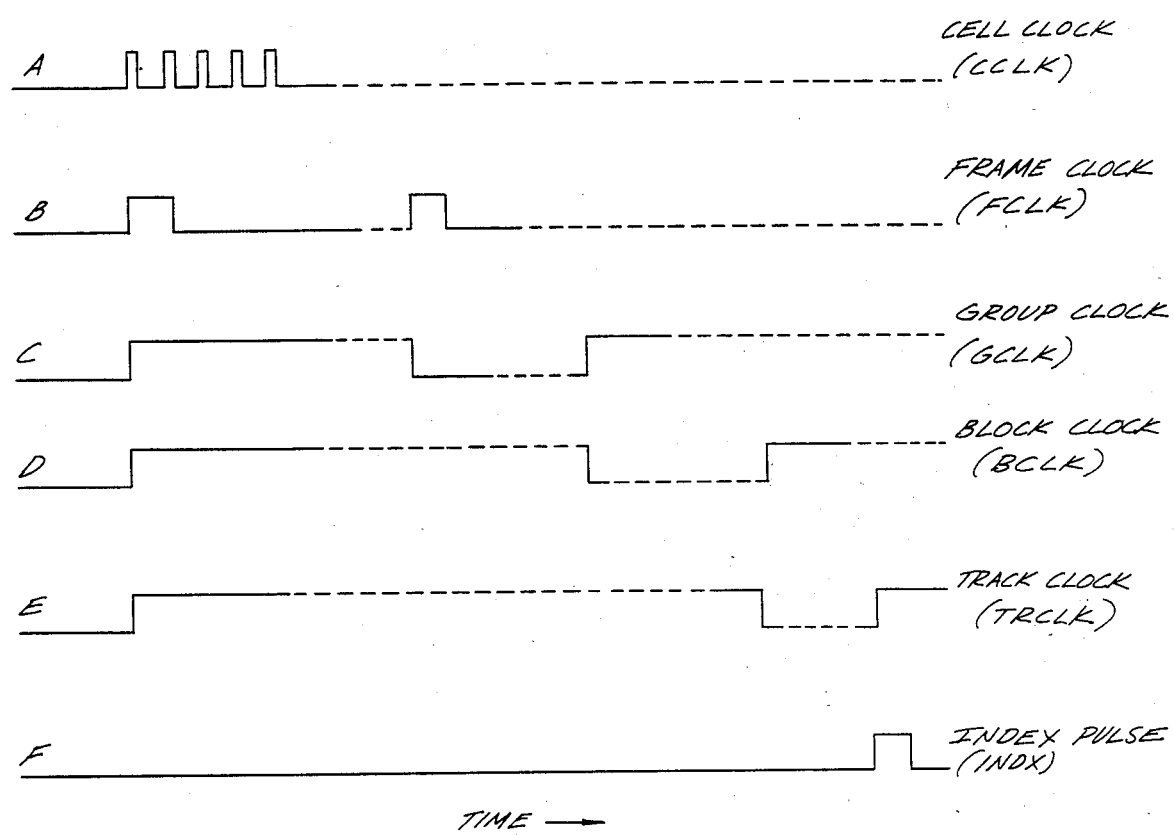
FIG. 5 is a series of timing diagrams, A-F, relating to the operation of the sections of FIGS. 3A-3C and 4A-4C.

At the start of each block, BCLK is high for the entire period of the first group within the block (FIG. 5). Therefore, when BCLK is high, it is used to disable the group count comparators 126 and 128, and also to select a different area of the RAM, so as to allow output of the 4-bit group selectors. Therefore, BCLK disables the comparators 126, 128 and changes the RAM address (A9) bit. The RAM now provides a new 8-bit output, of which the least significant 4-bits are the group selectors. When BCLK ends, the trailing edge latches the new group selector into a register included in RAM 120 where it waits, as in a pipeline, for the proper time to energe. A second latch advances the group selectors into action at the next leading edge of BCLK. Therefore, the group selectors are output from the RAM 120 during the first group of one block, for usage in selecting the group at the start of the next block. During all other times, the RAM block 120 and the 16-bit comparison process proceeds normally, except during the first group of each block.

Block RAM 120 contains two quantities: (1) Block lengths up to 16 blocks, in each of up to 16 tracks. Each length is 16-bits long, and is contained in two bytes. Thus, 512 bytes are required to store these values. (2) Group selectors for the same 16 blocks and 16 tracks. Each group selector is 4-bits wide, stored within the least significant half of a byte, in the least significant byte, of each two bytes. This, again 512 bytes are required, but 12 bits of each 16 are not used.

The block RAM 120 uses 10 address lines to access the 1024 bytes. The most significant address bit is A9, coming from a multiplexer 130 which normally transmits the BCLK signal. Address bit A9 to the RAM 120 is high during the first group of each block to allow group selector access, and bit A9 is low at other times to allow block length access.

The block RAM 120 address bits A8, A7, A6 and A5 are track selectors. They originate within the system of software, and the microprocessor loads them into a latch 132. It should be noted that this is the only access from the microprocessor to the pattern generator which does not destroy synchronization.

A second latch 134 takes the output of the first latch 132 at the start of each block, in a pipeline manner. Thus, the microprocessor can change the track selector at any time, but the pattern generator will only switch to a new track at the beginning of each block. A buffer 136, and the previously mentioned multiplexer 130 are used to pass the four track selector address bits A8, A7, A6 and A5 to the block RAM 120, or to switch to the address bits from the microprocessor.

The block RAM 120 address bits A4, A3, A2 and A1 are the block selector bits, coming through a buffer 138 from a special 4-bit block counter 140 which is incremented by BCLK. These same four bits are also compared to a 4-bit block length in a comparator 142 to determine when to reset the block counter 140. The 4-bit block length comes from the two 8-bit latches 132, 134. Thus, each of these latches has a 4-bit track selector and a 4-bit block length. Both latches must be loaded by the microprocessor when either is to be changed.

The block RAM 120 least significant bit of address (A0) is merely GCLK (FIG. 5). Therefore, the RAM output alternates. At the start of each group, during the first frame (when GCLK is high) the RAM output provides the most significant of two bytes. Later in the group, for all other frames, GCLK is low, so the RAM output provides the least significant of each of two-byte pairs.

The circuit of FIG. 3B also includes latch 144 functioning as an address latch, and buffer 136 functioning as a data latch. The addresses and data to and from the microprocessor are multiplexed, as designated by the terms AD0–AD7, and the address signals are stored in latch 144, whereas the incoming and outgoing data signals are stored in data input/output buffer 136. The data input/output buffer 136 and the address latch 144 allow the microprocessor to read/write the RAM 120 and to load the latches which store the length numbers. In normal operation, these components are disabled, and the RAM address and data are controlled by internal synchronization signals. However, when the microprocessor needs to access RAM 120, the normal synchronization is interrupted, and the RAM address and data buses are tri-stated, so that the microprocessor may control address and data through these otherwise used buffers. Control circuitry is also included to disable normally used outputs, and to enable the microprocessor to access the buffers and latches as required.

The 4-bit group length comes from two tandem 8-bit latches 146 and 148. These are loaded by group selector signals G0, G1, G2 and G3.

The circuitry of FIGS. 3A-3C has the following inputs:
CLK/ : 0 to 30 MHz maximum clock frequency used as the basic timing and synchronizing standard.
YNC/ : Normally high. When low, this signal stops the clock, in essence, freezing the pattern generator (including all internal operations other than CPU access.)
PEN: Normally high. When low, this signal forces the pattern data to be constantly low. However, the P.G. continues internal operations.
PS: Board Select. Normally high. When low, this signal allows the system CPU to read or write from/to the pattern generator (P.G.).
RD: Normally high. When low, and PS is low, then the system CPU can read from the P.G.
WR: Normally high. When low, and PS is low, then the system CPU can write to the P.G.
AD0 through AD7: Address and data. When the system CPU is reading or writing the P.G., then the AD lines carry the low order address to the P.G. and then convey the data.
A8, 9, 10 and 11: Most significant address lines for system PCU operations.

The RD and WR inputs are introduced to an "and" gate 150; the CLK/ and YNC/ inputs are introduced to a "nand" gate 152; and inputs A8, A9, A10 and A11 are introduced to a decoder 154. Input RD is also applied to an "and" gate 156, and input WR is applied to an "or" gate 158.

The circuitry has the following outputs:
PAT: This is the data forming the pattern, in serial NRZ form, cell by cell. Transitions are triggered with the falling edge of TCLK, but delayed by up to 15.2 nanoseconds.
EOP: System index. This is normally low, but goes high for one bit time (cell period) coincident with the data pattern last cell on any track.
AD0 thru AD7: See inputs.
FCLK: Pattern Generator internal timing. Starts each frame with a high level during the first cell. Not simplyi related to PAT or EOP, but EOP will always follow an FCLK by five TCLKs. FCLK is triggered by TCLK, but delayed by up to 15.2 nanoseconds.

All inputs and outputs are TTL levels:
"0"=0 to 0.8 V
"1"=2.4 to 5.5 V
A unit load is:
"0"=1.6 mA pullup maximum
"1"=40 microA pulldown maximum
3-State=50 microA leakage maximum
All inputs are less than:
AD0 through AD7:
"0"=4.25 unit loads
"1"=10.25 unit loads
All others:
"0"=2 unit loads
"1"=2 unit loads
All outputs can drive at least:
AD0 thru AD7:
"0"=12.5 unit loads
"1"=25 unit loads
All others:
"0"=12.5 unit loads
"1"=25 unit loads The circuitry of FIGS. 4A-4C contains a 7-bit cell counter made up of two counters 200 and 202 which completes one sequence for each frame. That is, the cell counter counts each cell up to the maximum 128 possible. The cell counter is the primary micro-timing component upon which all larger cycles are based. The cell counter outputs are compared in a comparator 204 with a number stored in a latch 206. When the two numbers match, then the cell counter will reset at the next clock pulse, and recommence its count. The number in latch 206 is derived from an input/output buffer 208. The number is placed in the buffer 208 by the central microprocessor, and it can have any value from 4 to 127 (corresponding to 5–128). The output of comparator 204, which goes low when the match occurs, is used for higher level timing. This output is referred to as End of Frame (EOF), since it corresponds with the last bit of each frame.

The four most significant bits derived from counter 202 are stored in a buffer 210, and are introduced to a frame RAM 212. This RAM also may be of the type designated AMD9128-70PC. The RAMs four higher bits of a total of eight are generated by a multiplexer 214, and latched in latch 216. These four higher address bits are used to select a specific frame. The frame RAM 212 has a 8-bit output. Thus, given the 4-bit frame selectors and the 4-bits from the cell counter, the frame RAM outputs eight bits, representing eight bits of a frame. The four higher address bits are derived from the central microprocessor unit by way of input/output buffer 208.

The output from frame RAM 106 is fed into a latch 220, and from there into an 8-bit shift register 222. The eight bits of the frame can then be shifted out, one-by-one. Meanwhile, the cell counter is counting in synchronism with the shift clock applied to the register. When the counter has counted eight pulses, the foremost significant bits increment, causing the RAM to have a new input address. This initiates another RAM access, and then the latching of the RAM data in latch 220, then the transfer into the shift register 222, and the shifting of the eight new bits of the frame out of the shift register.

The foregoing process continues until EOF occurs, causing the cell counter to be reset, and also causing new 4-bit frame selectors to become available, so that the RAM 212 now has a different address. It should be remembered that the four most significant bits represent the frame selector bits, and the four least significant bits are the counter bits. Now, a frame is output from the frame RAM 212. The frame RAM 212 contains eight bits per byte, with each frame using up to 16 bytes, for a total of 120 bits per frame, and with 16 frames, that is, 256 bytes, or 2048 bits total in the RAM. The most significant bit of the least significant byte is the first bit of frame type zero. The most significant byte 16 is the first bit of frame type #1 and so on.

The access to the frame RAM 212 takes about four clock cycles, at the fastest possible clock rate, so that special circuitry is required to advance the cell counter, latch the RAM data in latch 220, lead the shift register 222, and shift the data, all at precisely the correct instant. The correct timing is as follows: time 0 is when the cell counter has just been reset to all zeros. Exactly four clock pulses later, at the end of count 3, the output from frame RAM 212 is fed into latch 220. Exactly one count later, the data is transferred from the latch into shift register 222, and at that instant, the most significant bit is presented at the shift register output. The next seven clock pulses shift the remaining bits out of the shift register. The eighth clock pulse transfers the next byte from latch 220 to the shift register 222.

To accomplish the above timing, the circuitry of FIGS. 4A–4C contains a flip-flop 224 and a 4-bit counter 226, as well as "and" gates 228, 230 and "nand" gate 232. An isolating buffer 234 is also included in the circuit. The flip-flop 224 is normally in the one state, and it is reset at the next clock time, whenever one of two events occur: (1) End of Frame; (2) Count 3 of counter F163J, F163H. The $\overline{Q}$ output of the flip-flop is used as the clock to latch the frame RAM output in latch 220. This output rises at either the beginning of a new frame, or at the start of 4-bit counter 226.

The 4-bit counter 226 is used to load shift register 222 from latch 220. Each time the bit cell counter 200, 202 reaches count 3, the 4-bit counter 226 is forced to reset to zero at the next clock pulse. Next, the 4-bit counter 226, whenever its most significant bit equals zero, forces itself to load 9, at its next clock pulse. From there, the counter counts 9, 10, 11 . . . 15, 0, at which time it loads 9 and starts over, thus repeatedly completing a count of eight pulses.

The circuitry of FIG. 4A–4C also contains an 8-bit frame counter made up of counters 240, 242 which counts the number of frames in each group. The range for this counter is 2 to 256. The clock for the 8-bit frame counter is the frame clock (FCLK) derived from flip-flop 104 of FIG. 3B. This clock rises at the start of each frame for one bit time and it immediately follows and is derived from the End of Frame (EOF) signal.

The output from 8-bit frame counter 240, 242 is compared against the 8-bit output of a RAM 244 in a comparator 246. RAM 244 may also be of the type designated AMD9128-70PC. Stored within RAM 244 is one byte for each group. This RAM is designated the "Group-Length RAM", and it has only four address input bits, and therefore only 16 bytes are used, corresponding to the 16 possible group types. The 4-bit input to group length RAM 244 are the group selectors generated in the circuitry of FIGS. 3A–3C, and derived from a multiplexer 248.

When the output from the 8-bit frame counter 240, 242 matches the output from group-length RAM 244, the output of comparator 246 goes low, signifying the end of a group (EOG). This causes the frame counter to be reset to zero at the next frame clock pulse. It should be noted that EOG is a full frame long, whereas the previously mentioned timer pulses are 1-bit wide.

The seven high order bits from the frame counter 240, 242 flow through a buffer 250 to the address lines of a RAM 252 which, likewise, may be of the type designated AMD9128-70PC. RAM 252 contains the 4-bit frame selector bits used in frame production, and it is referred to as the Group RAM. The same four lines which the group-length RAM 244 used, that is the group selector bits, are used as the most significant address inputs to the group RAM 252. Therefore, eleven address bits are used for group RAM 252, seven from the frame counter 240, 242 and the four group selector bits from multiplexer 248.

As noted above, 4-bit frame selectors are stored in group RAM 252, however, the output of the RAM is 8-bits wide. Therefore, two frame selectors emerge simultaneously, but only one at a time is required.

Accordingly, the 8-bit output from the group RAM 252 is fed into multiplexer 214, with the four most significant bits from the RAM 252 being inserted into the A inputs (A0, A1, A2, A3) and the four least significant bits being introduced to the B inputs (B0, B1, B2, B3). The least significant bit of the frame counter 240, 242 is used as the input selector for multiplexer 214. Accordingly, if the least significant bit of the frame counter is low, the four most significant bits from group RAM 252 are used as the frame selector. Then, when that particular frame is complete, and another FCLK occurs, the frame counter increments, and the least significant bit goes high, causing the multiplexer 214 to select the four least significant bits from group RAM 252 as the next frame selector. As described above, the outputs Z0, Z1, Z2, Z3 from multiplexer 214 are latched in latch 216, and the output from the latch supplies the frame selector bits to the frame RAM 212.

Timing and sequence at the group level is just as important and critical as it is at the frame level. The first event is the End of Frame (EOF) coinciding with the last bit of a frame. From this is derived the frame clock (FCLK) as described above, which coincides with the first bit of the next frame. The leading edge of the frame clock (FCLK) does several things in sequence: (1) latches the next frame descriptor 4-bits to be used by frame production circuitry in latch 216, thereby allowing the group RAM 252 and the multiplexer 214 to change at this time, without affecting frame production; (2) increments the frame counter 240, 242 which in turn accomplishes the following: (a) depending upon whether the count is odd or even, may or may not change the address to group RAM 252, initiating a new access; (b) switches the multiplexer 248 causing selection of the alternate 4-bit frame selector; (c) provides a new 8-bit number to comparator 246 to check for End of Group.

The circuit of FIG. 4B also includes a latch 254 which functions as an address latch, and input/output buffers 256 and 258 which function as data latches for the RAMs 252 and 244. As described above, the addresses and data to and from the microprocessor are multiplexed, as designated by the terms AD0–AD7, and the address signals are stored in latch 254, whereas the incoming and outgoing data signals from the respective RAMs 252 and 244 are stored in the data input/output buffers 256 and 258. The data input/output buffers 256 and 258, and latch 254, allow the microprocessor to read/write the RAMs 252 and 244. In normal operation, as in the case of the circuitry of FIGS. 3A–3C, these components are disabled, and the addresses and data for the RAMs 252 and 244 are controlled by internal synchronizing signals. However, when the microprocessor needs access to either of the RAMs 252 or 244, the normal synchronization is interrupted, and the RAM address and data buses are tri-stated, so that the microprocessor may control address and data through these otherwise used buffers. Control circuitry is also included to disable the normally used outputs, and to enable the microprocessor to access the buffers and latches as required.

The various commands PS, RD and WR, applied to the circuitry of FIG. 4A are passed through a series of "and" gates, "nor" gates and "nand" gates, shown in FIG. 4A, which, together with decoders 260 and 262 provide appropriate control signals for the circuitry of FIGS. 4A–4C.

All logic used in the circuits of FIGS. 3A–3C and 4–4C is preferably the latest and fastest TTL logic available, such as Fairchild's new FAST Logic, which is designated by the 74FXX line. The Texas Instrument line 74ASXX may also be used. Actually, the fast logic is only necessary for the ultimate speeds of 30 MHz. If a slower pattern can be tolerated, then the 74SXX or even the 74LSXX lines may be acceptable. Any 74XXX line may be used, as long as only members of one line are used, and the associated speeds are acceptable. As mentioned above, the static RAMs used in the system are preferably AMD9128-70 which have a 70 nanosecond access, which is necessary for ultimate speeds. Again, if slower patterns can be tolerated, slower RAMs may be used.

When the Fairchild FAST Logic is used, the various elements may have the following identification numbers:

Flip-flops 100, 102, 104, 106, 108, 110, 112, 114, 116, 224 . . . 74F74.
"And" gates . . . 74F08.
"Nand" gates 74F00.
"Or" gates . . . 74F32.
"Nor" gates 74F02.
Decoders 152, 260 and 262 . . . 74F138.
Shift register 220 . . . 74F299.
Counters 124A–124D, 140, 200, 202, 226, 240, 242 . . . 74F163.
Comparators 126, 128, 142, 204, 246 . . . 74F521.
Multiplexers 130, 214 . . . 74F257.
Latches 132, 134, 144, 146, 148, 206, 216, 220, 254 . . . 74F374.
Buffers 136, 208, 256, 258 . . . 74F245.
Buffers 138, 210, 250 . . . 74F 244.

It will be appreciated that while a particular embodiment of the invention has been shown and described, modifications may be made, and it is intended in the following claims to cover all modifications which come within the true spirit and scope of the invention.

What is claimed is:

1. A programmable servo pattern generator for storing a plurality of different servo patterns to be selectively and automatically written into a magnetic disc of a magnetic disc drive each to occupy exactly one track on the disc, said generator including: memory means for storing a plurality of servo patterns; input circuit means connected to said memory means for entering the different servo patterns into said memory means, and selection circuitry connected to said memory means for selecting the different servo patterns from said memory means.

2. The servo pattern generator defined in claim 1, and which includes a key pad connected to said input circuit to enable an operator to enter the different patterns into said memory means.

3. The servo pattern generator defined in claim 1, in which each servo pattern selected by said selection circuitry comprises a high frequency pulse train of NRZ data.

4. The servo pattern generator defined in claim 1, in which each servo pattern stored in said memory means comprises repetitive sequences of data of varying lengths, with the smallest component being a cell which corresponds to one binary bit.

5. The servo pattern generator defined in claim 4, in which each of said sequences of varying numbers of cells comprises a frame, with a plurality of different types of frames being stored in said memory means each with a different sequence of cells.

6. The servo pattern generator defined in claim 5, in which a series of said frames are combined within each of said servo patterns to form a group.

7. The servo pattern generator defined in claim 6, in which said group is repeated a predetermined number of times in said servo pattern to form a block.

8. The servo pattern generator defined in claim 7, in which a selected number of blocks form the servo pattern for one track.

9. The servo pattern generator defined in claim 8, in which said input circuit means includes frame production circuitry, group production circuitry, block production circuitry and servo pattern production.

10. The servo pattern generator defined in claim 9, in which said memory means includes a first random access memory connected to said block production circuitry for storing blocks of desired lengths.

11. The servo pattern generator defined in claim 10, and which includes logic circuitry included in said input circuit means for introducing a multi-bit group selector signal into said first random access memory for each of said blocks.

12. The servo pattern generator defined in claim 9, in which said memory means includes a second random access memory connected to said frame production circuitry for storing different types of frames.

13. The servo pattern generator defined in claim 9, in which said memory means includes a third random access memory connected to said group production circuitry for storing different types of groups.

14. The servo pattern generator defined in claim 1, and which includes means for storing different servo patterns for different tracks of the disc.

15. The servo pattern generator defined in claim 1, and which includes a microprocessor control unit for transferring data into and out of the pattern generator and to supervise which track of the magnetic disc receives the stored pattern.

16. A process for storing a plurality of different servo patterns in the memory of a programmable servo generator, said process including the following steps: entering the different servo patterns into said memory, selecting the different servo patterns from said memory, and writing the servo patterns selected from said memory onto a magnetic disc.

17. The process defined in claim 16, in which each of said patterns written on said magnetic disc occupies exactly one track on the disc.

18. The process defined in claim 16, in which each selected servo pattern comprises a high frequency pulse train of NRZ data.

19. The process defined in claim 16, in which each servo pattern stored in said memory comprises repetitive sequences of data of varying lengths, with the smallest component being a cell which corresponds to one binary bit.

20. The process defined in claim 19, in which each of said sequences of varying number of cells comprises a frame, and which includes the step of storing a plurality of different types of frames in said memory of each with a different sequence of cells.

21. The process defined in claim 20, and which includes the step of combining a series of said frames within each of said servo patterns to form a group.

22. The process defined in claim 21, and which includes the step of repeating said group a predetermined number of times in said servo pattern to form a block.

23. The process defined in claim 22, and which includes the step of selecting a number of blocks to form the servo pattern for one track of the magnetic disc.

* * * * *